(12) United States Patent
Tian

(10) Patent No.: US 12,356,443 B2
(45) Date of Patent: Jul. 8, 2025

(54) RSSI REPORTING METHOD AND DEVICE, USER EQUIPMENT AND STORAGE MEDIUM

(71) Applicant: GUANGDONG OPPO MOBILE TELECOMMUNICATIONS CORP., LTD., Dongguan (CN)

(72) Inventor: Wenqiang Tian, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 414 days.

(21) Appl. No.: 17/742,814

(22) Filed: May 12, 2022

(65) Prior Publication Data

US 2022/0272720 A1 Aug. 25, 2022

Related U.S. Application Data

(63) Continuation of application No. PCT/CN2019/119006, filed on Nov. 15, 2019.

(51) Int. Cl.
*H04W 72/542* (2023.01)
*H04B 17/318* (2015.01)
*H04W 72/21* (2023.01)

(52) U.S. Cl.
CPC ........ *H04W 72/542* (2023.01); *H04B 17/318* (2015.01); *H04W 72/21* (2023.01)

(58) Field of Classification Search
CPC ... H04W 72/21; H04W 72/542; H04B 17/318
See application file for complete search history.

(56) References Cited

U.S. PATENT DOCUMENTS

| 11,616,625 B2* | 3/2023 | You ........... H04W 16/14 370/329 |
| 2019/0141734 A1* | 5/2019 | Lei ........... H04W 72/23 |

FOREIGN PATENT DOCUMENTS

| CN | 106464466 A | 2/2017 |
| CN | 109451588 A | 3/2019 |
| CN | 109644504 A | 4/2019 |

(Continued)

OTHER PUBLICATIONS

International Search Report Dated Aug. 6, 2020 from PCT Application No. PCT/CN2019/119006, 11 pages.

(Continued)

*Primary Examiner* — Yemane Mesfin
*Assistant Examiner* — Jia Hao Deng
(74) *Attorney, Agent, or Firm* — BAYES PLLC

(57) ABSTRACT

Some embodiments of the present application provide an RSSI reporting method and device, a user equipment (UE) and a storage medium. The RSSI reporting method includes performing RSSI measurement on sub-bands of a first bandwidth, the first bandwidth comprises at least two sub-bands; determining reporting information according to the RSSI measurement result for the sub-bands of the first bandwidth; and reporting the reporting information. According to the embodiments of the present application, the problem in the prior art of the impact on the normal scheduling of the UE by a base station due to the incomparability of RSSI data obtained on different first bandwidths can be overcome.

13 Claims, 9 Drawing Sheets

(56) References Cited

FOREIGN PATENT DOCUMENTS

EP    3331177 A1    6/2018

OTHER PUBLICATIONS

The supplementary European search report dated Nov. 22, 2022 from European patent Application No. 19952230.1.
Qualcomm Incorporated: "On RSSI and channel occupancy measurements in NR-U", 3GPP Draft; R4-1912359—On RSSI and channel occupancy measurements in NR-U, 3GPP, Mobile Competence Centre; 650, Route Des Lucioles; F-06921 Sophia-Antipolis CE, vol. RAN WG4, No. Chongqing, China; Oct. 4, 2019 (Oct. 4, 2019), the whole document.
ZTE: "Discussion on RSSI and CO measurements for NR-U", 3GPP Draft; R1-1911569 Discussion on RSSI and CO measurements for NR-U, 3GPP, Mobile Competence Centre; 650, Route Des Lucioles; F-06921 Sophia-Antipolis Cedex; vol. RAN WG1, No. Chongqing, China; Oct. 22, 2019 (Oct. 22, 2019), the whole document.
InterDigital, Inc.: "Initial Access and Mobility Procedures in NR-U", 3GPP Draft; R1-1902588—Initial Access and Mobility Procedures in NR-U, 3GPP, Mobile Competence Centre; 650, Route Des Lucioles; F-06921 Sophia-Antipolis Cedex; vol. RAN WG1, No. Athens, Greece; Feb. 16, 2019 (Feb. 16, 2019), the whole document.
Ericsson: "On measurement reporting criteria", 3GPP Draft; R4-1915253, 3GPP, Mobile Competence Centre; 650, Route Des Lucioles; F-06921 Sophia-Antipolis Cedex; France, vol. RAN WG4, No. Reno, Nevada, USA; Nov. 8, 2019 (Nov. 8, 2019), the whole document.

* cited by examiner

RSSI REPORTING METHOD AND DEVICE, USER EQUIPMENT AND STORAGE MEDIUM

CROSS REFERENCE TO RELATED APPLICATIONS

This is a continuation of an International Application No. PCT/CN2019/119006, filed on Nov. 15, 2019, entitled "RSSI REPORTING METHOD AND DEVICE, USER EQUIPMENT AND STORAGE MEDIUM," the contents of which is incorporated herein by reference in its entirety.

BACKGROUND OF DISCLOSURE

The present application relates to the field of wireless communication technology, and in particular to a method and device for RSSI uploading, a user equipment, and a storage medium.

In the communication between a User Equipment (UE) and a base station, the RSSI (Received Signal Strength Indication) is usually measured and reported for the base station to carry out scheduling based on the RSSI data reported by the UE.

In the current 4G and 5G systems, the UE performs RSSI measurement by measuring the signal energy strength in the first bandwidth of the UE and reporting the RSSI measurement to the base station. Furthermore, the UE also obtains and reports channel occupancy conditions based on the RSSI measurement and a specific threshold value. In particular, the first bandwidth of the UE can be set as required.

SUMMARY

It is an object of some embodiments of the present application to provide an RSSI reporting method and apparatus, a user equipment, and a storage medium that can overcome the problem of the prior art that may affect the normal scheduling of the UE by the base station due to the incomparability of the RSSI data obtained at different first bandwidths.

Embodiments of the present application provide a received signal strength indication (RSSI) reporting method, comprising: performing RSSI measurement on subbands of a first bandwidth, wherein the first bandwidth comprises at least two subbands; determining a report message based on a result of the RSSI measurement on the subbands of the first bandwidth; and reporting the report message.

Embodiments of the present application further provide an RSSI reporting device comprising: a measurement module for performing RSSI measurement on subbands of a first bandwidth, wherein the first bandwidth comprises at least two subbands; a calculation module for determining a report message based on a result of the RSSI measurement on the subbands of the first bandwidth; a reporting module for reporting the report message.

Embodiments of the present application further provide a user equipment (UE) comprising: at least one processor; and a memory communicatively connected to the at least one processor, wherein the memory stores one or more programs executable by the at least one processor; the one or more programs comprise instructions which, when executed by the at least one processor, causes the at least one processor to perform the RSSI reporting method.

Embodiments of the present application also provide a computer readable storage medium storing a program executable by a processor, the program, when executed by the processor, implementing the RSSI reporting method described above.

The present application embodiment now, in comparison with the prior art, performs RSSI measurement on subbands of the first bandwidth and obtains the report message based on the result of the RSSI measurement; i.e., the RSSI data of the subbands of the first bandwidth is reported, thereby overcoming the problem of the prior art that may affect the normal scheduling of the UE by the base station due to the incomparability of the RSSI report message obtained at different first bandwidths.

For example, the reporting scheme of the user equipment (UE) to which the RSSI reporting method is applied is designated as a first reporting scheme, wherein in the first reporting scheme, the performing RSSI measurement on subbands of the first bandwidth comprises: performing RSSI measurement on one or more of the subbands of the first bandwidth and obtaining a result of the RSSI measurement on one or more of the subbands. In this example, the RSSI measurement is performed on the subbands of the first bandwidth and reported, which can reflect the RSSI condition on the real subbands within the first bandwidth, i.e., the report message is more realistic and more conducive to the scheduling work of the base station.

For example, the reporting scheme of the UE to which the RSSI reporting method is applied is designated as a second reporting scheme. In the second reporting scheme, the RSSI measurement on the subbands of the first bandwidth comprises: performing an RSSI measurement on the first bandwidth and obtaining an RSSI measurement value on the first bandwidth; dividing the RSSI measurement value on the first bandwidth by a number of subbands contained in the first bandwidth to obtain the result of the RSSI measurement on the subbands of the first bandwidth. In this example, instead of adding the burden of reporting the values measured in the RSSI measurement, the RSSI measurement on the first bandwidth can be data processed and normalize to the subbands, to obtain the report message of the first bandwidth on the subband, as compared to the first reporting scheme described above, providing an alternative embodiment that is simple and fast.

For example, the reporting scheme of the UE to which the RSSI reporting method is applied is designated as a third RSSI reporting scheme. In the third reporting scheme, the RSSI measurement on the subbands of the first bandwidth comprises: performing RSSI measurement on one or more subbands in the first bandwidth to obtain RSSI measurement values on the one or more subbands; dividing the RSSI measurement values on the one or more subbands by a predetermined value to obtain the result of the RSSI measurement on the one or more subbands of the first bandwidth. In particular, the predetermined value is greater than one. In the example, after the RSSI measurement on the subbands, the RSSI measurement values on the subbands are further refined according to the predetermined value. As compared with the first reporting scheme above, RSSI data can be reported at smaller frequency domain granularity while minimizing the burden of collecting measured values in RSSI measurements, and as compared to the second reporting scheme, the information reported at smaller frequency domain granularity is more precise.

For example, the RSSI measurement of subbands of the first bandwidth is preceded by: receiving a notification from the base station designating a reporting scheme of the UE. In this example, the current reporting scheme of the UE may be designated in advance.

For example, at least one of the following information may be configured by the base station: the first bandwidth, subbands of the first bandwidth are configured by the base station. This example provides one way of configuring the first bandwidth and its subbands.

For example, a plurality of the subbands of the first bandwidth have equal bandwidths.

For example, the subbands are listen before talk (LBT) subbands. The LBT subbands are subbands in unlicensed spectrum, i.e., the RSSI reporting method in this example can be applied to an unlicensed band.

BRIEF DESCRIPTION OF DRAWINGS

One or more embodiments are illustrated exemplarily by the pictures in the accompanying drawings corresponding thereto, and these exemplary descriptions do not constitute a limitation of the embodiments. Elements having the same reference numerical designation in the accompanying drawings are indicated as similar elements. The drawings in the accompanying drawings do not constitute a limitation of scale unless specifically asserted. The following division of the individual embodiments is for descriptive convenience and shall not constitute any limitation on the specific manner of implementation of the present disclosure, and the individual embodiments may be combined with each other for mutual reference without contradiction.

DETAILED DESCRIPTION OF EMBODIMENTS

In order to make the purpose, technical solutions and advantages of the present application more clear and comprehensible, some embodiments of the present application are described in further detail hereinafter in conjunction with the accompanying drawings and embodiments. It should be understood that the specific embodiments described herein are intended to explain the present application only and are not intended to limit the present application.

The inventors have identified at least the following problems in the prior art: the first bandwidth for RSSI measurement is not certain for a particular UE, i.e., different first bandwidths can be selected according to different needs; since RSSI essentially reflects to the received energy, it accumulates energy accordingly as the first bandwidth increases; when the RSSI measurement value(s) are used to compare with a specific threshold value to reflect the current channel occupancy, the UE may mistakenly interpret the high RSSI measurement value caused by a large first bandwidth as the high RSSI measurement value caused by excessive channel occupancy, and form a wrong channel occupancy report, which affects the normal scheduling of the system to the UE.

Based on the above problems identified by the inventors, the inventors propose technical solutions of the present application.

Figure 1:
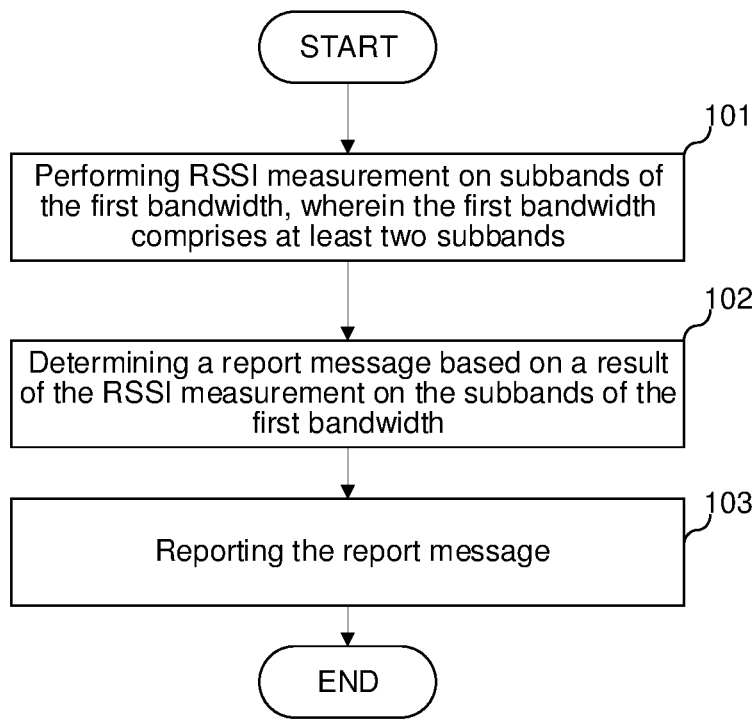
FIG. 1 is a flowchart of an RSSI reporting method in accordance with a first embodiment of the present application.

The first embodiment of the present application relates to a RSSI reporting method, applied to a user equipment (UE), as shown in FIG. 1, comprising the following steps:

Step 101: performing RSSI measurement on subbands of the first bandwidth, wherein the first bandwidth comprises at least two subbands;

Step 102: determining a report message based on a result of the RSSI measurement on the subbands of the first bandwidth;

Step 103: reporting the report message.

In the embodiment, the UE internally pre-stores a first bandwidth for RSSI measurement and subbands of the first bandwidth. In one example, both the first bandwidth and the subbands of the first bandwidth may be configured by the base station. Alternatively, in another example, the UE internally pre-stores the first bandwidth for RSSI measurement and the frequency domain granularity of that first bandwidth. The first bandwidth may be pre-configured by the base station for the UE and allocated to the UE, and the frequency domain granularity of the first bandwidth may be pre-defined by the base station and sent to the UE. The first bandwidth and its frequency domain granularity may be sent together or separately, for example, by broadcast or specific Radio Resource Control (RRC) signaling. The UE takes the first bandwidth and the frequency domain granularity to obtain the subbands of the first bandwidth as well as the number of the subbands. However, without limitation, in other examples, the UE may configure the first bandwidth and the frequency domain granularity of the first bandwidth according to the actual situation.

In the embodiment, the frequency domain granularity may be set as desired. For example, in the unlicensed band, usually one LBT subband is used as the basic unit, and the base station performs scheduling based on the report message of this basic unit, which may make the scheduling more reasonable. Then, the size of this frequency domain granularity can be set to the bandwidth of one LBT subband, such as 20 MHz or 10 MHz. In the licensed band, it can also be set to 20 MHz or 10 MHz as needed. The size of a frequency domain granularity here is for example only and is not limited by the embodiment.

In one example, a threshold value based on the frequency domain granularity, i.e., a threshold value corresponding to the subband bandwidth, may be set by the base station. That is, the base station may set the threshold value based on the frequency domain granularity of the first bandwidth and send the set threshold value to the UE.

For example, the base station pre-stores correspondence between the frequency domain granularity and the threshold value, obtains and sends the threshold value corresponding to the frequency domain granularity of the first bandwidth to the UE. However, without limitation, it may also be that the UE pre-stores correspondence between the frequency domain granularity and the threshold value, and the corresponding threshold value may be obtained based on the frequency domain granularity. The correspondence between the frequency domain granularity and the threshold value can be set according to the actual needs, for example, according to the channel performance requirements in the actual scheduling work. Generally, the larger the frequency domain granularity is, the higher the corresponding threshold value is. In the embodiment, the bandwidth of one subband may be equal to the size of the frequency domain granularity of the first bandwidth.

In step 101, the UE, in performing RSSI measurement on the subbands of the first bandwidth, collects RSSI measurements, i.e., obtains a plurality of RSSI measurement values, within a predetermined measurement duration.

In step 102, the UE may calculate a channel occupancy assessment value for the subbands of the first bandwidth based on the plurality of RSSI measurement values and the threshold value corresponding to the bandwidth of the subbands. The report message includes at least the channel occupancy assessment value and may also include the plurality of RSSI measurement values. In particular, the report message may be reported to the base station via specific RRC signaling.

Specifically, the RSSI measurement values exceeding the threshold value are identified from the plurality of RSSI measurement values, and a percentage of the RSSI measurement values exceeding the threshold value to the plurality of RSSI measurement values is calculated as the channel occupancy assessment value of the first bandwidth at the frequency domain granularity.

For example, if the total number of RSSI measurement values is M and the number of such RSSI measurement values exceeding the threshold is N, the channel occupancy assessment value=(N/M)*100%.

In the embodiment, as compared to the prior art, the first bandwidth is preset with a frequency domain granularity, and the report message of the first bandwidth at the frequency domain granularity is obtained based on the RSSI measurement and the threshold value corresponding to the frequency domain granularity. That is, the reported RSSI data of the first bandwidth is transformed with respect to the frequency domain granularity, which can overcome the problem that the RSSI report message of different first bandwidths in the prior art is not comparable and may affect the normal scheduling performed by the base station for the UE.

Figure 2:
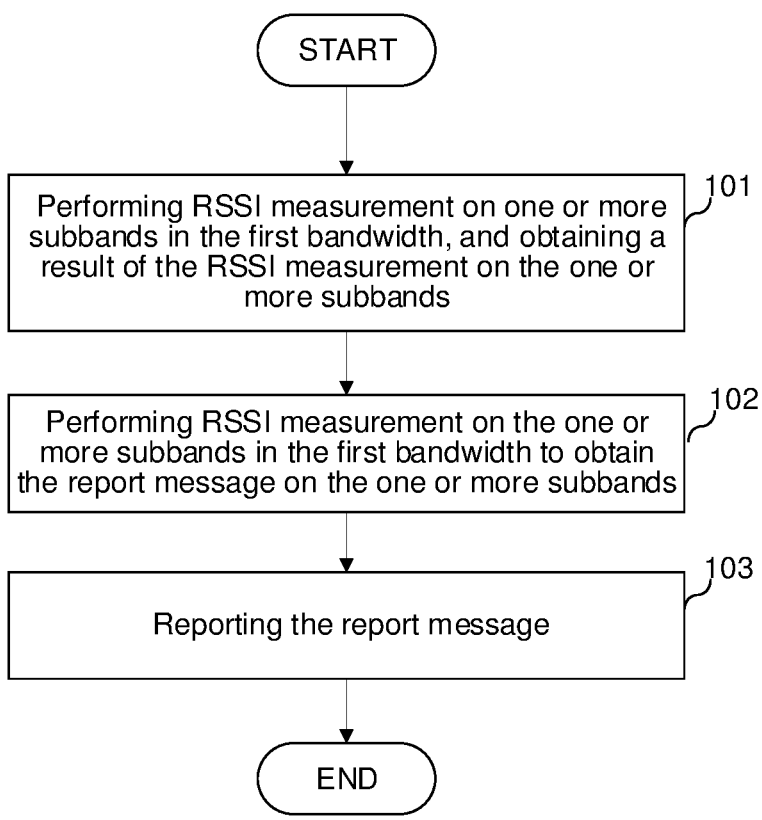
FIG. 2 is a specific flowchart of the RSSI reporting method according to a first embodiment of the present application.

In the embodiment, the UE's reporting scheme is designated as a first reporting scheme. As shown in FIG. 2, a specific flowchart of the RSSI reporting method under the first reporting scheme is.

Step 101 specifically comprises: performing RSSI measurement on one or more subbands in the first bandwidth, and obtaining a result of the RSSI measurement on the one or more subbands.

Step 102 specifically comprises: performing RSSI measurement on the one or more subbands in the first bandwidth to obtain the report message on the one or more subbands. That is, based on the RSSI measurement value on each subband and the threshold value set based on the frequency domain granularity, the report message for each subband is obtained, and the report message for each subband is used as the report message for the first bandwidth at the frequency domain granularity.

In an example, the first bandwidth has one frequency domain granularity, and the UE divides the first bandwidth equally into a plurality of subbands based on this frequency domain granularity, i.e., each subband is equal to one unit of the frequency domain granularity and has the same bandwidth. The UE performs RSSI measurement on every subband within a preset measurement duration and obtains a plurality of RSSI measurement values on all of the subbands. For each subband, the UE identifies from the plurality of RSSI measurement values the RSSI measurement value(s) exceeding the threshold value and calculates the number of RSSI measurement value(s) exceeding the threshold value as a percentage of the total number of the plurality of RSSI measurement values and treats the percentage as the channel occupancy assessment value for the subband. The report message includes at least the channel occupancy assessment value for each subband. In particular, the report message may also include an average of a plurality of RSSI measurement values for all of the subbands, but is not limited thereto.

For example, the plurality of RSSI measurement values may be reported directly, or may be processed and reported by reporting processed characteristic data representing the plurality of RSSI measurement values, which are obtained from the processed RSSI measurement values. In the embodiment, each subband is used as one unit of the frequency domain granularity, and the report message of the first bandwidth at the frequency domain granularity may include the report message of each subband.

Figure 3:
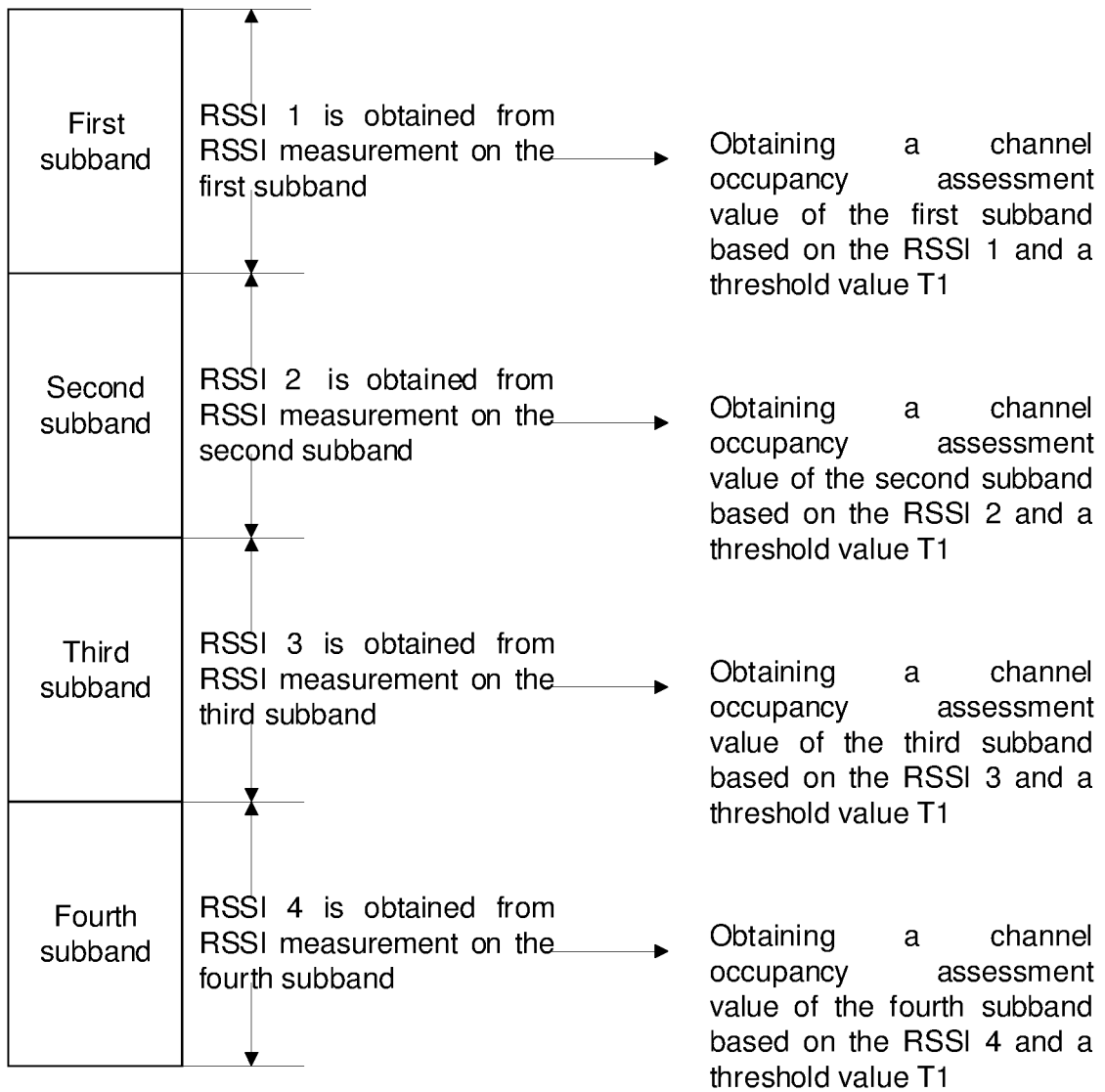
FIG. 3 is a schematic diagram of an example of a first bandwidth containing a plurality of subbands according to a first embodiment of the present application.

In one example, as shown in FIG. 3, a first bandwidth is assumed to be 80 M with a frequency domain granularity of 20 M. The threshold value T1 based on this frequency domain granularity is set at 12. This first bandwidth is divided into four subbands, namely, a first subband, a second subband, a third subband, and a fourth subband. An RSSI measurement value on the first subband is noted as RSSI 1, an RSSI measurement value on the second subband is noted as RSSI 2, an RSSI measurement value on the third subband is noted as RSSI 3, and an RSSI measurement value on the fourth subband is noted as RSSI 4.

Taking the first subband as an example, with an assumption that six RSSI measurement values, RSSI 1, on the first subband comprise 10, 10, 10, 15, 15, and 15, since the threshold value is 12 and the number of RSSI measurement values exceeding the threshold value is three, the channel occupancy assessment value of the first subband is (3/6) *100%=50% and the average value of the six RSSI measurement values is 12.5. The report message of the first subband may comprise the channel occupancy assessment value 50% and the average value 12.5 of the six RSSI measurement values of the first subband. The other three subbands are calculated in a similar manner and are not repeated here.

In step 103, when the report message of the subbands is calculated, the report message of each subband can be reported to the base station in turn; or the report messages of every subband can be reported together.

For example, a report list containing multiple report messages, each report message corresponding to a subband and containing the channel occupancy assessment value and the average value of the RSSI measurement values of the subband.

The following is the data structure of the report list MeasResultForRSSIList of the UE in the embodiment.

```
MeasResultForRSSIList ::=   SEQUENCE   (SIZE (1..maxSubband))
OF MeasResultForRSSI
    MeasResultForRSSI ::=           SEQUENCE {
    rssi-Result                     RSSI-Range,
    channelOccupancy                INTEGER (0..100),
    ...
}
``` where maxSubband indicates the maximum number of subbands that can be reported; MeasResultForRSSI represents the report message, the report list can have one or more report messages (only one is listed here as an example), and one subband corresponds to one report message; each report message contains rssi-Result and channelOccupancy; rssi-Result indicates an RSSI measurement value on a subband, which in the embodiment may be the average of multiple RSSI measurement values on the subband; and channelOccupancy indicates the channel occupancy assessment value of the subband.

In the example of FIG. 3, if the first bandwidth changes, e.g., the first bandwidth changes to 100 M, while the frequency domain granularity remains the same, it is reasonable that the first bandwidth can be divided equally into five subbands and each subband is still equal to one unit of frequency domain granularity. Since the UE always reports with the report message obtained from the RSSI measurement on the subbands, i.e., always with the report message at the frequency domain granularity, it can be observed that the different first bandwidths do not affect the comparability of the RSSI report message, as long as the frequency domain granularity remains the same.

In the example of FIG. 3, the first bandwidth has only one frequency domain granularity. If the first bandwidth has multiple frequency domain granularities, threshold values corresponds to the frequency domain granularities one-to-one, i.e., the threshold values are also plural. Although each subband is equal to one frequency domain granularity, the bandwidth of each subband may be different because it is obtained by being divided based on different frequency domain granularities. In calculating the channel occupancy assessment value of a subband, the calculation is based on the RSSI measurement values on the subband and the threshold value corresponding to the bandwidth of the subband.

Figure 4:
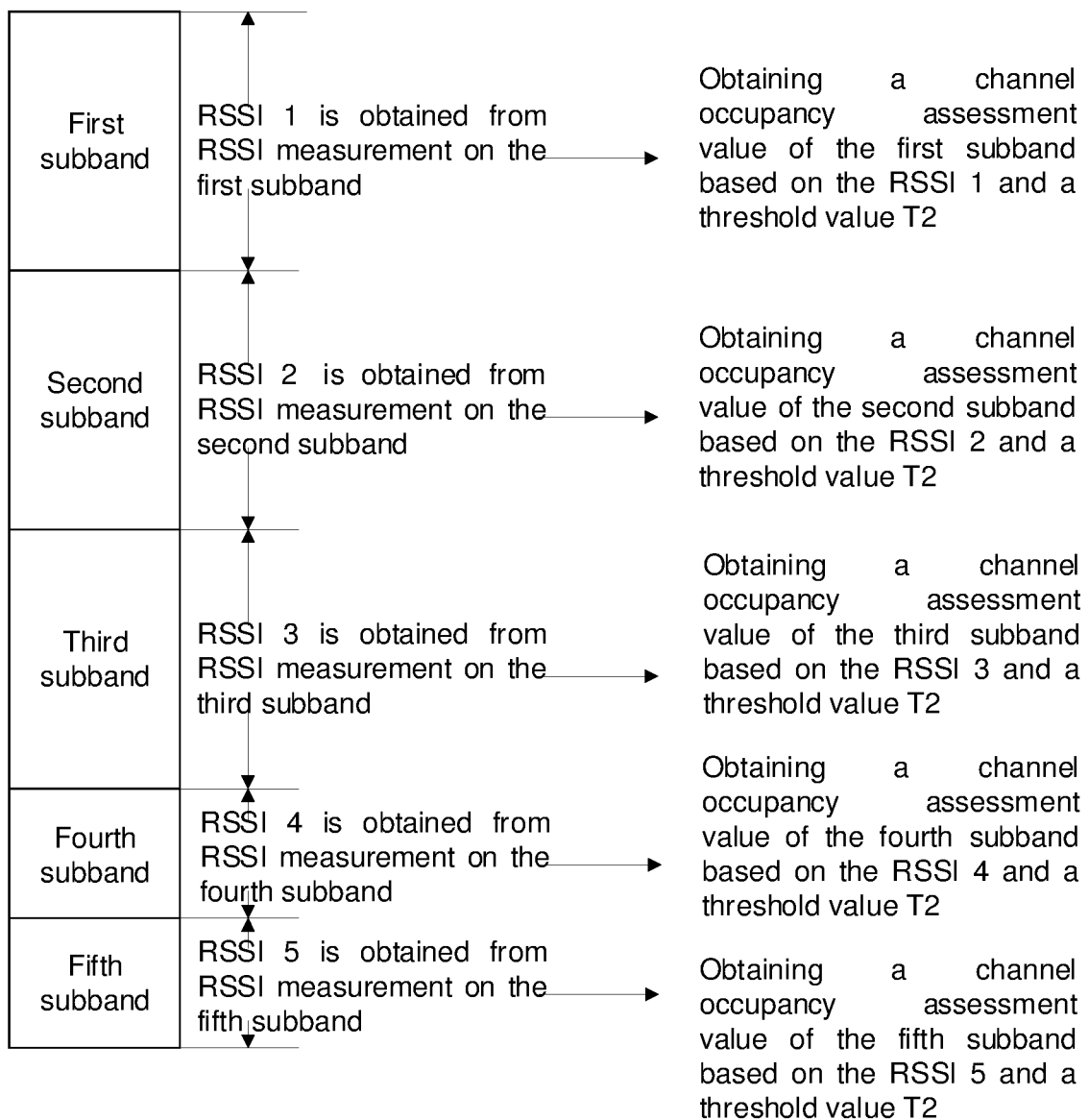
FIG. 4 is a schematic diagram of another example of a first bandwidth containing a plurality of subbands according to the first embodiment of the present application.

In another example, as shown in FIG. 4, it is assumed that the first bandwidth is 80 M and has two frequency domain granularities, of which the first frequency domain granularity is 20 M, and the second frequency domain granularity is 10 M. The first frequency domain granularity corresponds to a threshold value T2=12, and the second frequency domain granularity is 10 M corresponding to a threshold value T3=6. In this example, the first bandwidth can be divided into five subbands, where the first subband, the second subband, and the third subband are all divided according to the first frequency domain granularity, i.e., the bandwidths of the first subband, the second subband, and the third subband are all 20 M, while the fourth subband and the fifth subband are divided according to the second frequency domain granularity, i.e., the bandwidths of the fourth subband and the fifth subband are both 10 M.

The RSSI measurement value on the first subband are denoted as RSSI 1, the RSSI measurement value on the second subband are denoted as RSSI 2, and the RSSI measurement value on the third subband are denoted as RSSI 3, the RSSI measurement value on the fourth subband as RSSI 4, and the RSSI measurement value on the fifth subband as RSSI 5. The following are examples of the first and fourth subbands.

Suppose the six RSSI measurement values RSSI 1 on the first subband are 10, 10, 10, 15, 15, and 15; since the threshold value T2=12, the calculated channel occupancy assessment value of the first subband is 50%, and the average value of the six RSSI measurement values of the first subband is 12.5, so the report message of the first subband includes the channel occupancy assessment value of the first subband 50% and the average value 12.5 of the six RSSI measurement values. The second and third subbands have the same threshold values as the first subband, and are not detailed by more examples here.

Assuming that the six RSSI measurement values RSSI 1 on the fourth subband are 5, 5, 5, 11, 11, and 11, since the threshold value T3=6, the calculated channel occupancy assessment value for the fourth subband is 50%. The average value of the six RSSI measurement values of the fourth subband is 8. Therefore, the report message of the fourth subband includes the channel occupancy assessment value of the fourth subband 50% and the average value 8 of the six RSSI measurement values. In particular, the corresponding threshold value of the fifth subband is the same as that of the fourth subband, and is not detailed by more examples here.

Once the report message for each subband is calculated, the report message for each subband can be reported to the base station in turn, of which the specific implementation is similar to the previous example and will not be repeated here.

In yet another example, it is assumed that the first bandwidth is 80 M, the set frequency domain granularity is 80 M, and the corresponding threshold value is 48. Since the size of the frequency domain granularity is the same as the size of the first bandwidth, i.e., the first bandwidth here is a frequency domain granularity, RSSI measurement is performed on the first bandwidth. If the six RSSI measurement values on the first bandwidth are 40, 40, 40, 60, 60, and 60. Accordingly, the UE calculates the channel occupancy assessment value of the first bandwidth at the frequency domain granularity to be 50%. The report message includes the channel occupancy assessment value 50% of the first bandwidth at the frequency domain granularity. In particular, the UE may further calculate an average value 50 of RSSI measurement values, and the report message may further include an average value 50 of the RSSI measurements values.

As can be seen above, in the first reporting scheme, the first bandwidth can be divided into a plurality of subbands based on frequency domain granularity, each subband being equal to one unit of frequency domain granularity, and measurements are made and reported on the subbands, which can reflect the RSSI condition and differences in different subbands within the first bandwidth, i.e., the report message is more informative and more conducive to the operation of scheduling performed by the base station.

It is noted that the frequency domain granularity can be set as desired. However, typically, the frequency domain granularity can be set smaller than the first bandwidth, which facilitates greater comparability of the report message. That is, when the report message also contains the average of the RSSI measurement values at the frequency domain granularity, the average of the RSSI measurement values at the frequency domain granularity is more reasonable for comparing.

Figure 5:
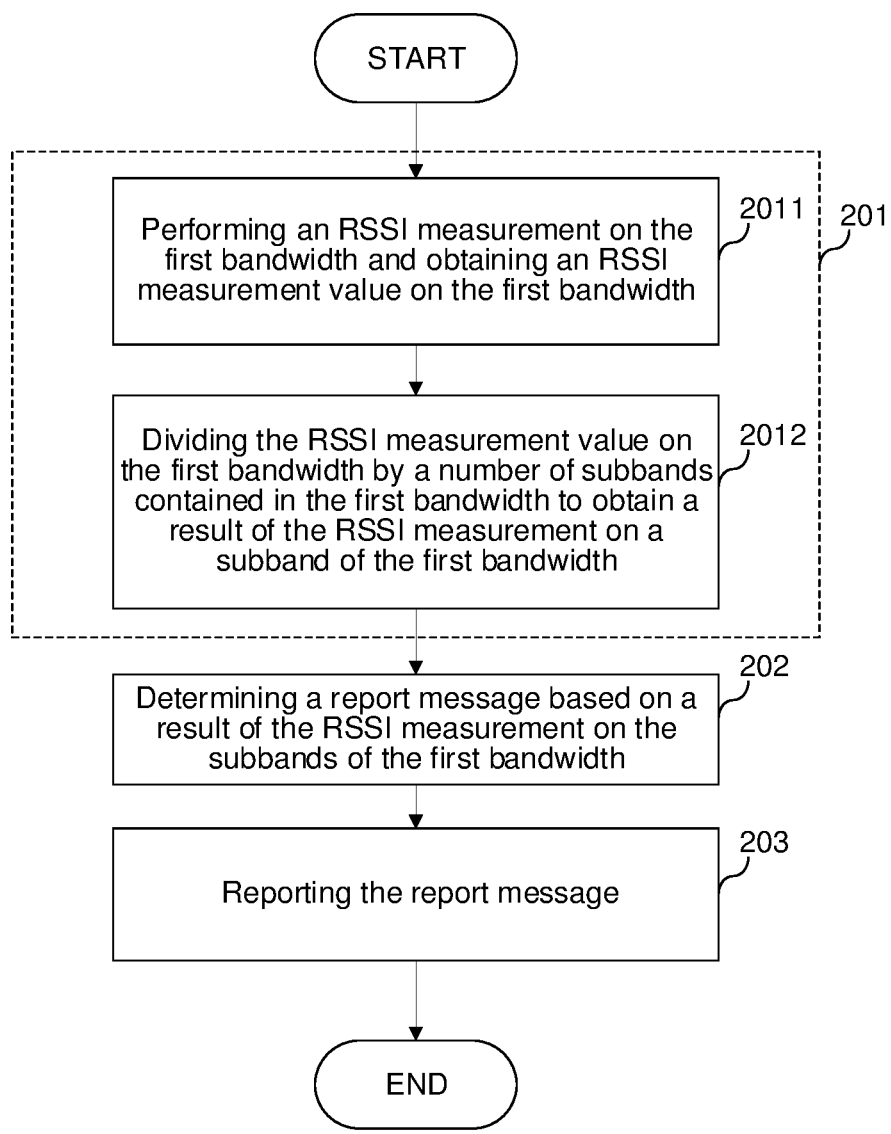
FIG. 5 is a specific flowchart of an RSSI reporting method in accordance with a second embodiment of the present application.

A second embodiment of the present application relates to an RSSI reporting method, in which the RSSI measurement may be preset to a second reporting scheme. FIG. 5 shows a specific flowchart of the RSSI reporting method in the second reporting scheme.

Step 201: performing an RSSI measurement on a subband of the first bandwidth. The step 201 specifically comprises:

Sub-step 2011: performing an RSSI measurement on the first bandwidth and obtaining an RSSI measurement value on the first bandwidth;

Sub-step 2012: dividing the RSSI measurement value on the first bandwidth by a number of subbands contained in the first bandwidth to obtain a result of the RSSI measurement on a subband of the first bandwidth.

Step 202: determining a report message based on the result of the RSSI measurement on the subband of the first bandwidth, which is similar to step 102 in FIG. 1, and thus is not repeated here.

Step 203: reporting the report message, which is similar to step 103 in FIG. 1, and thus is not repeated here.

In the embodiment, the UE performs RSSI measurement on the first bandwidth within a predetermined measurement duration and obtains a plurality of RSSI measurement values on the first bandwidth.

First, the UE calculates a number of frequency domain granularities contained in the first bandwidth (i.e., the number of subbands). Second, the UE divides the RSSI measurement values on the first bandwidth by the number of frequency domain granularities contained in the first bandwidth to obtain normalized RSSI measurement values. Here, the number of frequency domain granularities contained in the first bandwidth can be noted as a normalization parameter, i.e., the UE can divide the RSSI measurement values on the first bandwidth by the normalization parameter to obtain the normalized RSSI measurement values. In particular, the RSSI measurement values are plural, the UE divides each of the RSSI measurement values by the normalization parameter to obtain each of the normalized RSSI measurement values.

The UE compares each of the normalized RSSI measurement values with a threshold value corresponding to the frequency domain granularity, identifies the normalized RSSI measurement value(s) that exceed that threshold value, and calculates a percentage representing the RSSI measurement value(s) that exceed that threshold value to that plurality of RSSI measurement values as a channel occupancy assessment value for that first bandwidth. In particular, the report message comprises the channel occupancy assessment value for that first bandwidth. The UE may also calculate an average of the normalized RSSI measurement values, and the report message may also contain the average of the normalized RSSI measurement values.

The report message MeasResultForRSSI_Normalized reported by the UE in the embodiment is shown in the following:

```
MeasResultForRSSI_Normalized ::= SEQUENCE {
    rssi-Normalized              RSSI-Range,
    channelOccupancy-Normalized  INTEGER (0..100),
    ...
}
``` wherein rssi-Normalized indicates the normalized RSSI measurement values over the first bandwidth, which in the embodiment may be the average of a plurality of normalized RSSI measurement values; channelOccupancy-Normalized indicates the channel occupancy assessment value over the first bandwidth.

Figure 6:
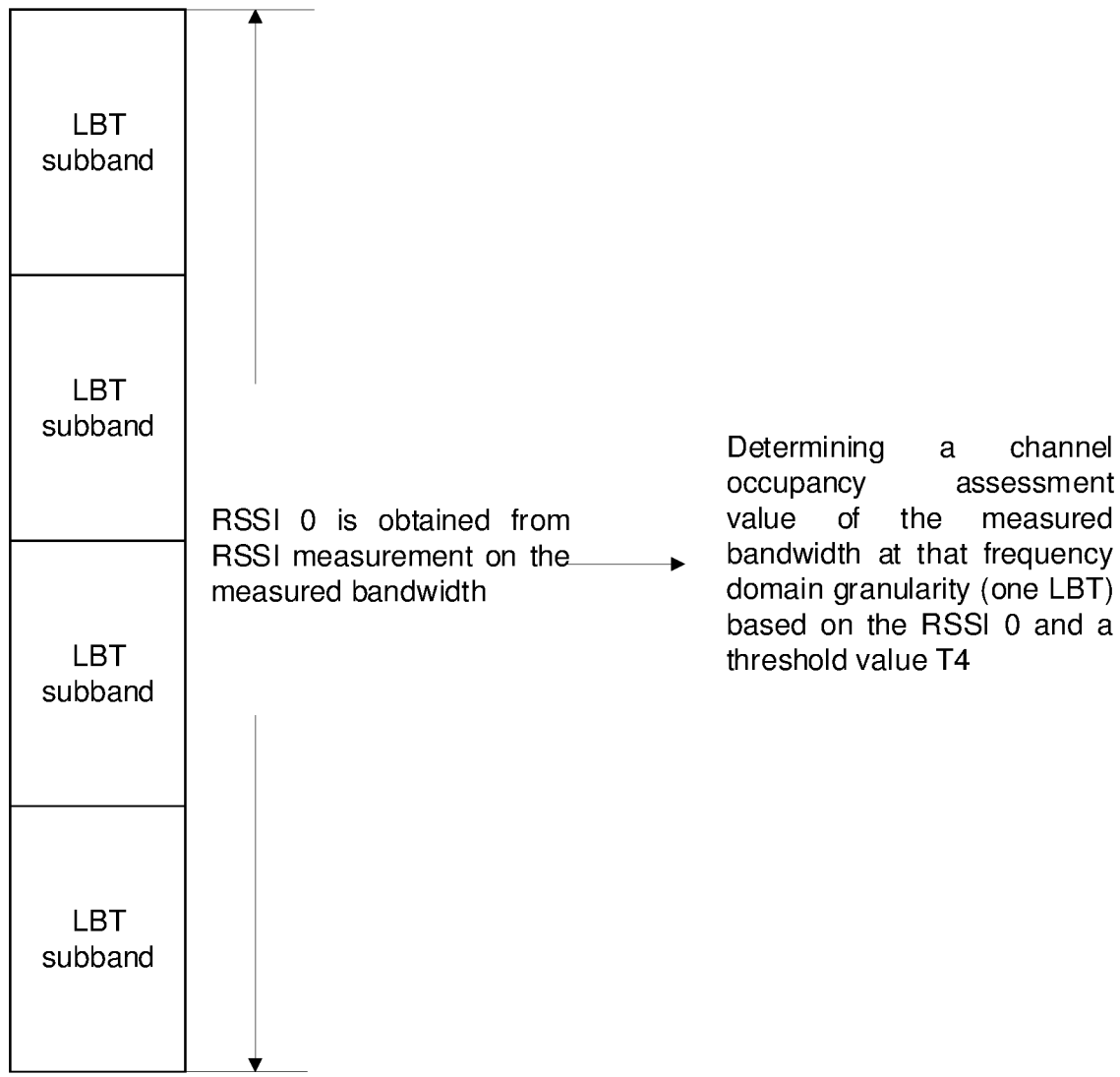
FIG. 6 is a schematic diagram of an example of RSSI measurement over a first bandwidth in accordance with the second embodiment of the present application.

In one example, as shown in FIG. 6, it is assumed that the first bandwidth is 80 M and the frequency domain granularity is one LBT subband, e.g., 20 M, and the frequency domain granularity corresponds to a threshold value T4=12. The number of frequency domain granularities contained in the first bandwidth is 4, such as four the LBT subbands in FIG. 6. The plurality of RSSI measurement values over the first bandwidth is noted as RSSI 0.

Suppose that the six RSSI measurement values RSSI 0 on the first bandwidth are 40, 40, 40, 60, 60, and 60. Each of the RSSI measurement values are normalized with respect to the frequency domain granularity to obtain the each of the normalized RSSI measurement values as 10, 10, 10, 15, 15, and 15. Since the frequency domain granularity of 20 M corresponds to a threshold value of 12, the channel occupancy assessment value of the first bandwidth at that frequency domain granularity is 50%. The average value of the normalized RSSI measurement values is 12.5. Thus, the report message of the first bandwidth at the frequency domain granularity may include the channel occupancy assessment value 50% of the first bandwidth at that frequency domain granularity and the average value 12.5 of the normalized RSSI measurement values.

Figure 7:
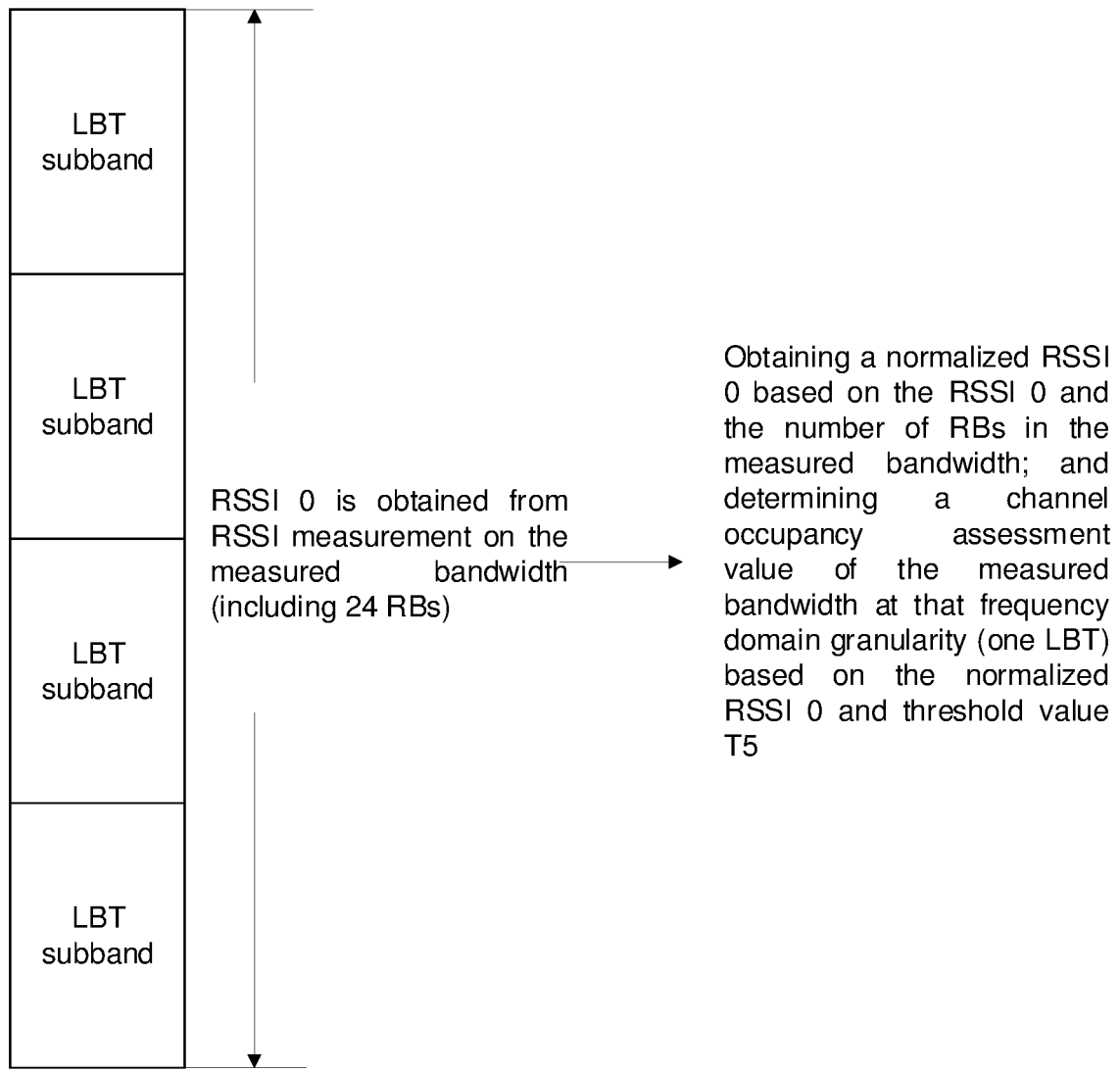
FIG. 7 is a schematic diagram of another example of RSSI measurement over a first bandwidth in accordance with the second embodiment of the present application.

Under the unlicensed band, one LBT subband may typically be treated as one basic unit, i.e., it can be understood that the first bandwidth may contain a number of LBT subbands. As illustrated in the above example, the frequency domain granularity may be set to one LBT subband. That is, the UE converts the RSSI measurement values of the RSSI obtained on the first bandwidth to one LBT subband for further assessment. However, in another example, as shown in FIG. 7, the UE can also convert the RSSI measurement values of the RSSI obtained on the first bandwidth to a Resource Block (RB) for further assessment, and in this case, the frequency domain granularity can be set to one Resource Block RB (RB). The first bandwidth in FIG. 7 is the same as the first bandwidth in FIG. 6. The first bandwidth in FIG. 7 contains four LBT subbands. If an LBT subband contains six RBs, the total number of RBs in the first bandwidth is 24. Accordingly, the UE divides RSSI measurement values on the first bandwidth by 24 to obtain the normalized RSSI measurement values. Furthermore, the UE calculates the channel occupancy of the first bandwidth on one RB based on the normalized RSSI measurement values and the threshold value T5 corresponding to one RB, and the detailed calculation process is not repeated.

In the embodiment, the RSSI measurement values obtained from the RSSI measurement on the first bandwidth is normalized to the frequency domain granularity. When compared to the first reporting scheme aforementioned, without increasing the burden of collecting the RSSI measurement values in the RSSI measurement, the report message of the first bandwidth on the frequency domain granularity can be obtained through data processing by way of normalizing the RSSI measurement values with respect to the frequency domain granularity, which provides an alternative way of implementation that is simple and fast.

Figure 8:
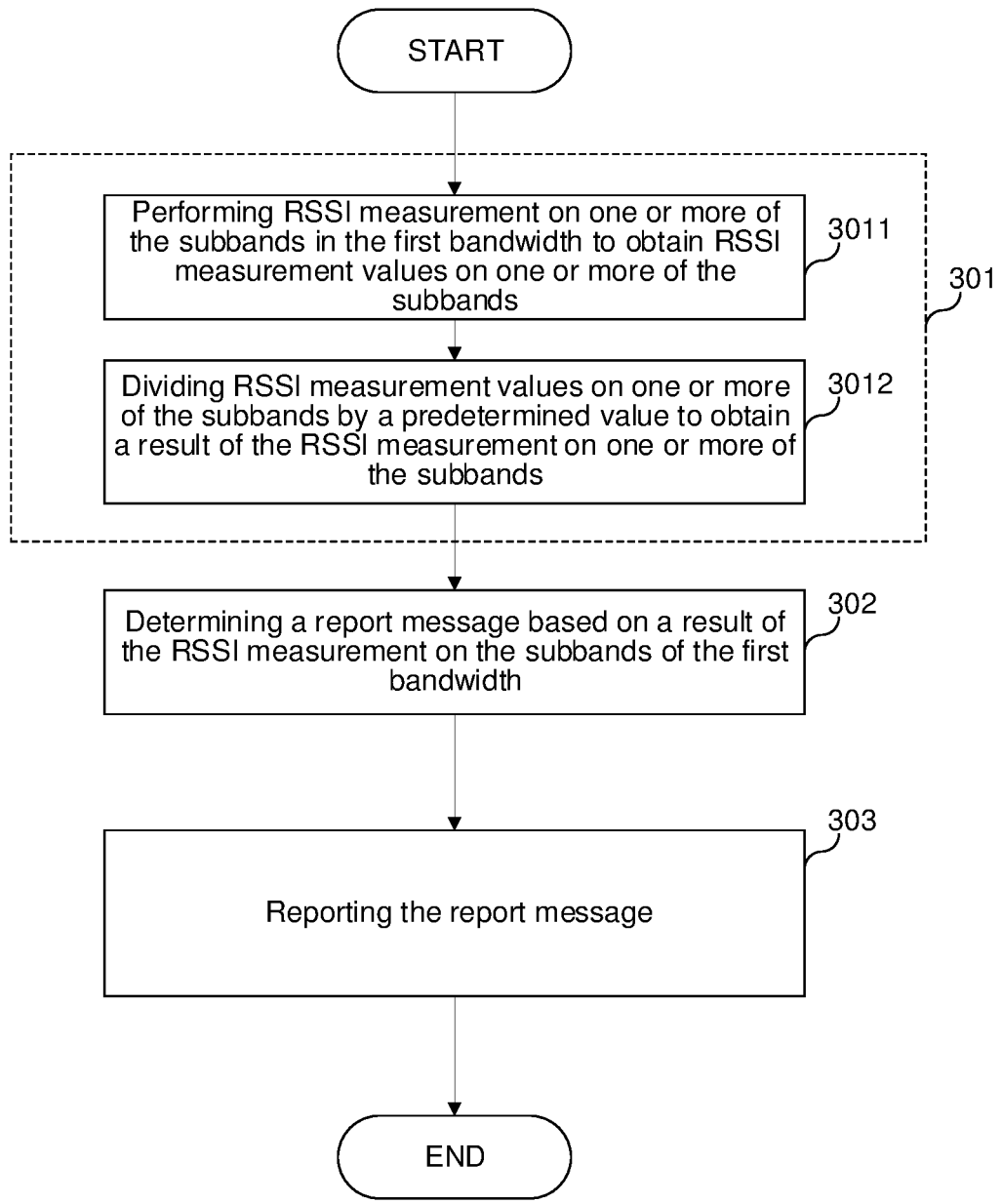
FIG. 8 is a specific flow diagram of an RSSI reporting method according to a third embodiment of the present application.

A third embodiment of the present application relates to an RSSI reporting method. In the embodiment, the RSSI measurement may be preset to a third reporting scheme. FIG. 8 shows a specific flowchart of the RSSI reporting method in the third reporting scheme.

Step 301: the RSSI measurement is performed on a subband of the first bandwidth. Step 301 comprises:

Sub-step 3011: performing RSSI measurement on one or more of the subbands in the first bandwidth to obtain RSSI measurement values on one or more of the subbands.

Sub-step 3012: dividing RSSI measurement values on one or more of the subbands by a predetermined value to obtain a result of the RSSI measurement on one or more of the subbands wherein the predetermined value is greater than 1.

Step 302: determining the report message based on the result of the RSSI measurement on the subbands of the first bandwidth, which is similar to step 102 in FIG. 2 above, and not repeated herein.

Step 303: reporting the report message, which is similar to step 102 in FIG. 2 above, and not repeated herein.

In the embodiment, the report message for each subband may be reported to the base station in sequence. Alternatively, the report message for all the subbands may be reported together.

For example, there is a report list containing multiple reports, each report corresponding to a subband and containing a channel occupancy assessment value and an average value of RSSI measurement values for the subband. The data structure of the report list in the embodiment is similar to that in the first embodiment and will not be repeated here.

In the embodiment, the frequency domain granularity comprises two frequency domain granularities, i.e., a first frequency domain granularity and a second frequency domain granularity. The second frequency domain granularity is smaller than the first frequency domain granularity.

In one example, it is assumed that the first bandwidth is 80 M, the first frequency domain granularity is 20, and the second frequency domain granularity is 10. The second frequency domain granularity corresponds to a threshold value of 6. Based on the first frequency domain granularity, this first bandwidth is divided into four subbands, which are the first subband, the second subband, the third subband, and the fourth subband.

Taking the first subband as an example, it is assumed that the six RSSI measurement values RSSI 1 on the first subband are 10, 10, 10, 15, 15, and 15. Since the number of second frequency domain granularities included in the first frequency domain granularity is 2, i.e., a pre-defined value here is 2, the six RSSI measurement values on the first subband are normalized with respect to the second frequency domain granularity, i.e., the six RSSI measurement values on the first subband are divided by 2 to obtain the normalized six RSSI measurement values: 5, 5, 5, 7.5, 7.5, and 7.5. Since the threshold value is 12, the number of RSSI measurement values exceeding the threshold value is three, the channel occupancy assessment value of the first subband at the second frequency domain granularity is 50%, and the report message contains at least the channel occupancy assessment value of the first subband on the second frequency domain granularity. The report message contains at least the channel occupancy assessment value of the first subband at the second frequency domain granularity. In particular, the channel occupancy assessment value of the first subband at the second frequency domain granularity can also be understood as the channel occupancy assessment value of the first bandwidth at the second frequency domain granularity.

In the embodiment, the subband is divided according to the first frequency domain granularity, and the RSSI measurement values of the RSSI on the subband are normalized to the second frequency domain granularity, wherein the first frequency domain granularity is smaller than the second frequency domain granularity. When compared with the aforementioned first reporting scheme, the RSSI data on the smaller frequency domain granularity can be reported while minimizing the burden of collecting RSSI measurement value(s) in the RSSI measurement. Additionally, when compared to the second reporting scheme, the report message reported at the smaller frequency domain granularity is more precise.

Figure 9:
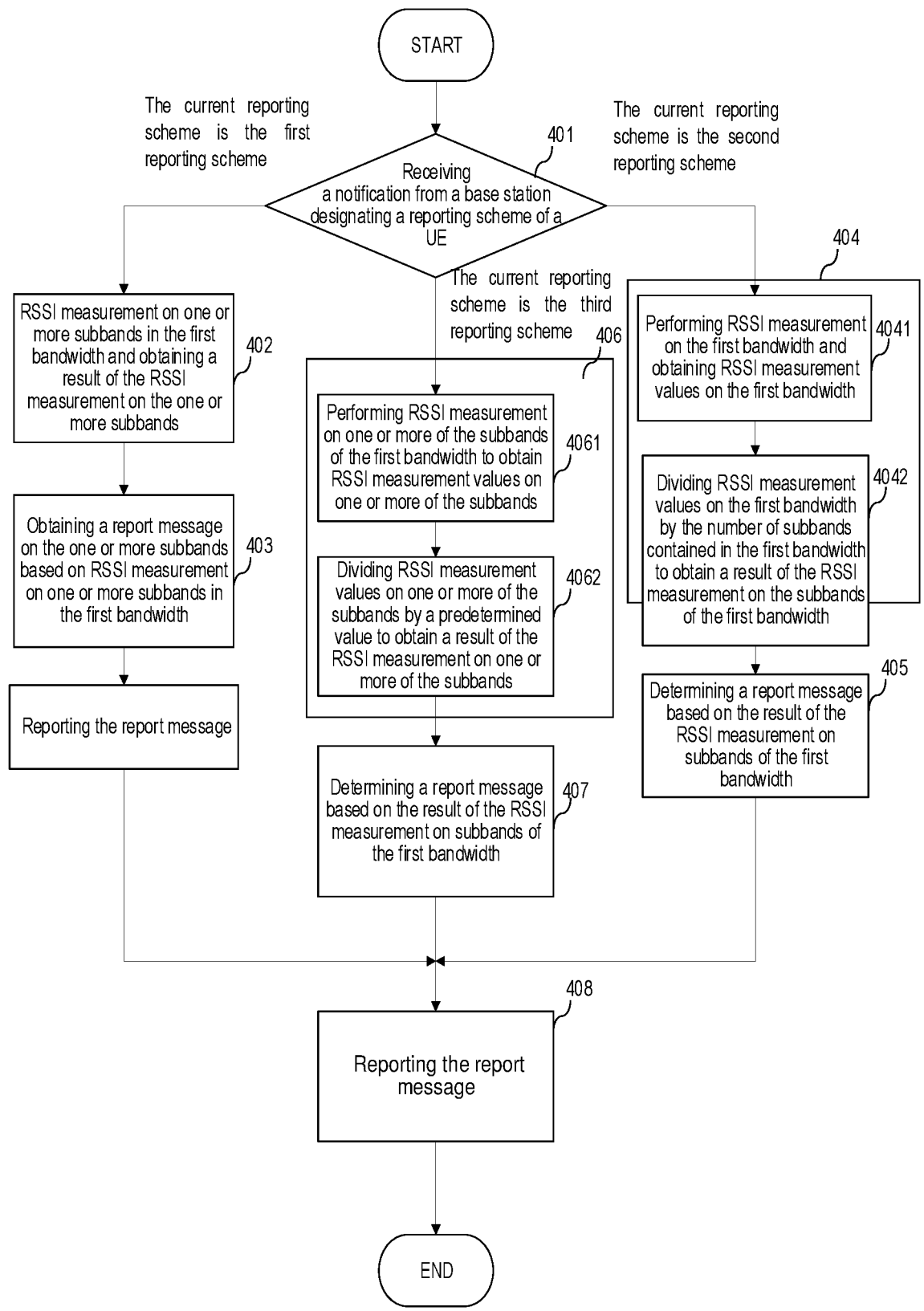
FIG. 9 is a specific flow diagram of an RSSI reporting method in accordance with a fourth embodiment of the present application.

FIG. 9 shows a flowchart of a fourth embodiment of the present application related to an RSSI reporting method, comprising the following steps.

Step 401: receiving a notification from the base station designating a reporting scheme of the UE. The reporting scheme comprises one of the following: a first reporting scheme, a second reporting scheme, and a third reporting scheme.

If the reporting scheme is the first reporting scheme, steps 402, 403, and 408 are performed.

Step 402 comprises: performing an RSSI measurement on one or more subbands in the first bandwidth and obtaining a result of the RSSI measurement on the one or more subbands. In particular, step 402 is similar to sub-step 101 in FIG. 2 and is not repeated herein.

Step 403, performing RSSI measurement on one or more subbands in the first bandwidth, and obtaining the report message on the one or more subbands. In particular, step 403 is similar to step 102 in FIG. 2 and will not be repeated herein.

If the reporting scheme is a second reporting scheme, step 404, step 405, and step 408 are performed.

Step 404: performing an RSSI measurement on a subband of the first bandwidth. Step 404 includes sub-step 4041, performing RSSI measurement on the first bandwidth and obtaining RSSI measurement values on the first bandwidth; and sub-step 4042, dividing RSSI measurement values on the first bandwidth by the number of subbands contained in the first bandwidth to obtain a result of the RSSI measurement on the subbands of the first bandwidth, wherein sub-step 4041 and sub-step 4042 are similar to sub-step 2011 and sub-step 2012 in FIG. 5 and are not repeated herein.

Step 405 comprises: determining a report message based on the result of the RSSI measurement on subbands of the first bandwidth. In particular, step 405 is similar to sub-step 202 of FIG. 5 and is not repeated herein.

If the reporting scheme is the third reporting scheme, step 406, step 407, and step 408 are performed.

Step 406: performing an RSSI measurement on a subband of the first bandwidth. Step 406 comprises: sub-step 4061, performing RSSI measurement on one or more of the subbands of the first bandwidth to obtain RSSI measurement values on one or more of the subbands; and sub-step 4062, dividing RSSI measurement values on one or more of the subbands by a predetermined value to obtain a result of the RSSI measurement on one or more of the subbands. In particular, sub-step 4061 and sub-step 4062 is similar to sub-step 3011 and sub-step 3012 in FIG. 8 and are not repeated herein.

Step 407: determining a report message based on the result of the RSSI measurement on subbands of the first bandwidth. In particular, step 407 is similar to step 302 in FIG. 8 and will not be repeated herein.

Step 408: reporting the report message, which is similar to step 103 in FIG. 2, and not repeated herein.

Note that the current reporting scheme in the embodiment is not limited to the first reporting scheme, second reporting scheme, and third reporting scheme. Additionally, the current reporting scheme may be a fourth reporting scheme.

For example, the fourth reporting scheme may be: the UE performs RSSI measurement on the first bandwidth within a preset measurement duration and obtains a plurality of RSSI measurement values on the first bandwidth; the UE compares the plurality of RSSI measurement values with the specified threshold value, identifies the RSSI measurement value(s) exceeding the specified threshold value, and calculates the percentage of the RSSI measurement value(s) exceeding the specified threshold value to the total number of RSSI measurement as the channel occupancy assessment value; the UE also calculates an average value of the plurality of RSSI measurement values; the UE uses at least the channel occupancy assessment value and the average value of the individual RSSI measurement values as the report message on the measured bandwidth. In particular, the specified threshold value involved in the fourth reporting scheme refers to a threshold value pre-defined by the UE.

In the embodiment, the UE may have a plurality of reporting schemes for RSSI measurement configured internally. The UE may be pre-designated a reporting scheme as the current reporting scheme and perform the RSSI reporting method based on the current reporting scheme. The current reporting scheme may be specified by the base station for the UE as needed and sent to the UE via broadcast or specific RRC signaling, which is not limited hereto.

Figure 10:
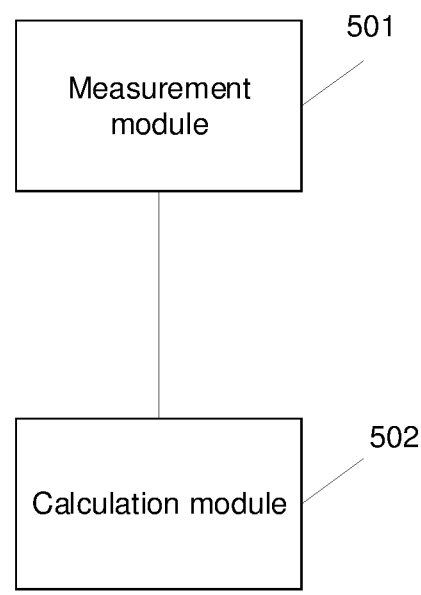
FIG. 10 is a block diagram of an RSSI reporting device according to a fifth embodiment of the present application.

As shown in FIG. 10, a fifth embodiment of the present application relates to an RSSI uplink device, comprising:

a measurement module 501 for performing RSSI measurement on subbands of a first bandwidth; the first bandwidth comprising at least two subbands;

a calculation module 502 for determining a report message based on a result of the RSSI measurement on the subbands of the first bandwidth; and a reporting module for reporting the report message.

As can be appreciated, the implementation is an embodiment of the device corresponding to any of the first to fourth embodiments, and the embodiment may be implemented in conjunction with any of the first to fourth embodiments. The relevant technical details mentioned in any of the first to fourth embodiments are still applicable in the present embodiment and will not be repeated here in order to reduce repetition. Accordingly, the relevant technical details mentioned in the present embodiment may also be applied in any of the first to fourth embodiments.

It is worth mentioning that each module involved in the present embodiment is a logical module. In practical applications, a logical unit may be a physical unit, or a part of a physical unit, or may be implemented as a combination of multiple physical units. Moreover, in order to highlight the innovative part of the present disclosure, the present embodiment does not introduce units that are less closely related to solving the technical problem presented by the present disclosure, but this does not indicate that other units do not exist in the present embodiment.

Figure 11:
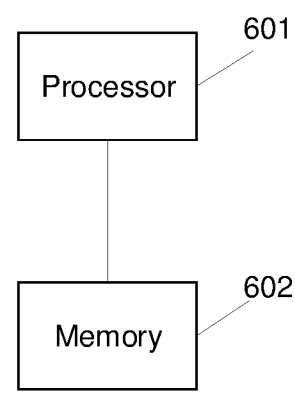
FIG. 11 is a block diagram of a user equipment in accordance with a sixth embodiment of the present application.

As shown in FIG. 11, a sixth embodiment of the present disclosure relates to a user equipment, comprising:

at least one processor 601;

a memory 602, communicatively connected to the at least one processor 601, wherein the memory 602 stores one or more programs executable by the at least one processor 601;

wherein the one or more programs comprises instructions, and the instructions, when executed by at least one processor 601, causes the at least one processor 601 to execute the method embodiment.

In particular, the memory 602 and the processor 601 are connected using a bus. The bus may include any number of interconnected buses and bridges. The bus connects together various circuits of the one or more processors 601 and the memory 602. The bus may also connect together various other circuits such as peripheral devices, voltage regulators, and power management circuits, all of which are well known in the art and therefore will not be further described herein. The bus interface provides an interface between the bus and a transceiver. The transceiver may be a single element or a plurality of elements, such as a plurality of receivers and transmitters, providing units for communicating with various other devices on a transmission medium. Data processed by processor 601 is transmitted over wireless medium via an antenna. Further, the antenna also receives data and transmits the data to processor 601.

The processor 601 is responsible for managing the bus and the general processing, and may also provide various functions including timing, peripheral interfacing, voltage regulation, power management, and other control functions. Further, the memory 602 may be used to store data used by the processor 601 in performing operations.

A seventh embodiment of the present disclosure relates to a computer readable storage medium storing a computer program. The computer program implements the method embodiments described above when executed by the processor.

It will be understood by those of ordinary skill in the art that the embodiments described above are specific embodiments that implement the present application, and that various modifications can be made to them in form and any detail in practical application without departing from the spirit and scope of the present application.

What is claimed is:

1. A method for received signal strength indication (RSSI) for a user equipment (UE), comprising:

performing RSSI measurement on subbands of a first bandwidth, wherein the first bandwidth comprises at least two subbands;

determining a report message based on a result of the RSSI measurement on the subbands of the first bandwidth, wherein the report message of the first bandwidth at a frequency domain granularity is obtained based on the RSSI measurement and a threshold value corresponding to the frequency domain granularity; and reporting the report message;

wherein a reporting scheme of the UE to which the RSSI reporting method is applied is designated as a second reporting scheme or a third reporting scheme, wherein in the second reporting scheme, the RSSI measurement on subbands of the first bandwidth comprises:

performing an RSSI measurement on the first bandwidth and obtaining a RSSI measurement value on the first bandwidth; and dividing the RSSI measurement value on the first bandwidth by a number of subbands contained in the first bandwidth to obtain the result of the RSSI measurement on the subbands of the first bandwidth;

wherein in the third reporting scheme, the RSSI measurement on subbands of the first bandwidth comprises:

performing RSSI measurement on one or more of the subbands of the first bandwidth, and obtaining a RSSI measurement value on one or more of the subbands;

dividing the RSSI measurement value on one or more of the subbands by a predetermined value to obtain the RSSI measurement on one or more of the subbands, wherein the predetermined value is greater than 1.

2. The method of claim 1, wherein before performing the RSSI measurement of the subbands of the first bandwidth, further comprising:
  receiving a notification from a base station designating the reporting scheme for the UE.

3. The method of claim 2, wherein at least one of the following information is configured by the base station: the first bandwidth, the subbands of the first bandwidth.

4. The method of claim 1, wherein a plurality of the subbands of the first bandwidth have equal bandwidths.

5. The method of claim 1, wherein the subbands are listen before talk (LBT) subbands.

6. The method of claim 1, wherein the determining the report message based on the result of the RSSI measurement of the subbands of the first bandwidth comprises:
  calculating, as a channel occupancy assessment value for the subbands, a percentage of RSSI measurement values exceeding a threshold value corresponding to a bandwidth of the subband among a plurality of RSSI measurement values contained in the result of the RSSI measurement for the subbands, wherein the report message comprises at least the channel occupancy assessment value.

7. A device for received signal strength indication (RSSI) reporting, wherein the device is equipped with a processor communicatively connected to a memory storing one or more programs executable by the processor, and the device comprises:
  a measurement module configured to cause the processor to perform RSSI measurement on subbands of a first bandwidth, wherein the first bandwidth comprises at least two subbands;
  a calculation module configured to cause the processor to determine a report message based on a result of the RSSI measurement on the subbands of the first bandwidth, wherein the report message of the first bandwidth at a frequency domain granularity is obtained based on the RSSI measurement and a threshold value corresponding to the frequency domain granularity; and
  a reporting module configured to cause the processor to report the report message;
  wherein the device is designated as a second reporting scheme or a third reporting scheme;
  wherein in the second reporting scheme, the measurement module is configured to perform an RSSI measurement on the first bandwidth and obtain a RSSI measurement value on the first bandwidth, and divide the RSSI measurement value on the first bandwidth by a number of subbands contained in the first bandwidth to obtain the result of the RSSI measurement on the subbands of the first bandwidth;
  wherein in the third reporting scheme, the measurement module is configured to perform RSSI measurement on one or more of the subbands of the first bandwidth and obtain a RSSI measurement value on one or more of the subbands, and divide the RSSI measurement value on one or more of the subbands by a predetermined value to obtain the RSSI measurement on one or more of the subbands, wherein the predetermined value is greater than 1.

8. A user equipment (UE) comprising:
  at least one processor; and
  a memory communicatively connected to the at least one processor,
  wherein the memory stores one or more programs executable by the at least one processor; and
  the one or more programs comprise instructions which, when executed by the at least one processor, causes the at least one processor to perform the following:
  performing RSSI measurement on subbands of a first bandwidth, wherein the first bandwidth comprises at least two subbands;
  determining a report message based on a result of the RSSI measurement on the subbands of the first bandwidth, wherein the report message of the first bandwidth at a frequency domain granularity is obtained based on the RSSI measurement and a threshold value corresponding to the frequency domain granularity; and
  reporting the report message;
  wherein the UE is designated as a second reporting scheme or a third reporting scheme;
  wherein in the second reporting scheme, the instructions, when executed by the at least one processor, causes the at least one processor to perform an RSSI measurement on the first bandwidth and obtain a RSSI measurement value on the first bandwidth, and divide the RSSI measurement value on the first bandwidth by a number of subbands contained in the first bandwidth to obtain the result of the RSSI measurement on the subbands of the first bandwidth;
  in the third reporting scheme, the instructions, when executed by the at least one processor, causes the at least one processor to perform RSSI measurement on one or more of the subbands of the first bandwidth, and obtain a RSSI measurement value on one or more of the subbands, and divide the RSSI measurement value on one or more of the subbands by a predetermined value to obtain the RSSI measurement on one or more of the subbands, wherein the predetermined value is greater than 1.

9. The UE of claim 8, wherein before performing the RSSI measurement of the subbands of the first bandwidth, the instructions, when executed by the at least one processor, causes the at least one processor to further perform:
  receiving a notification from a base station designating a reporting scheme for the UE.

10. The UE of claim 9, wherein at least one of the following information is configured by the base station: the first bandwidth, the subbands of the first bandwidth.

11. The UE of claim 8, wherein a plurality of the subbands of the first bandwidth have equal bandwidths.

12. The UE of claim 8, wherein the subbands are listen before talk (LBT) subbands.

13. The UE of claim 8, wherein the instructions, when executed by the at least one processor, causes the at least one processor to perform:
  calculating, as a channel occupancy assessment value for the subbands, a percentage of RSSI measurement values exceeding a threshold value corresponding to a bandwidth of the subband among a plurality of RSSI measurement values contained in the result of the RSSI measurement for the subbands, wherein the report message comprises at least the channel occupancy assessment value.

* * * * *